(12) United States Patent
Gould (10) Patent No.: US 7,522,667 B2
(45) Date of Patent: Apr. 21, 2009

(54) METHOD AND APPARATUS FOR DYNAMIC DETERMINATION OF FRAMES REQUIRED TO BUILD A COMPLETE PICTURE IN AN MPEG VIDEO STREAM

(75) Inventor: Theodore J. Gould, Los Angeles, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 776 days.

(21) Appl. No.: 11/065,403

(22) Filed: Feb. 24, 2005

(65) Prior Publication Data

US 2006/0188016 A1 Aug. 24, 2006

(51) Int. Cl.
*H04N 7/12* (2006.01)
(52) U.S. Cl. .................................. 375/240.26
(58) Field of Classification Search ............ 375/240.01, 375/240.12, 240.13, 240.15, 240.26; H04N 7/12
See application file for complete search history.

(56) References Cited

U.S. PATENT DOCUMENTS

| 2003/0079228 A1 | 4/2003 | Lin et al. |
| 2003/0079229 A1 | 4/2003 | Lin |
| 2003/0093801 A1 | 5/2003 | Lin et al. |

OTHER PUBLICATIONS

Wee, Susie J. et al; "Efficient Processing of Compressed Video"; IEEE; 1998; pp. 855-859.

*Primary Examiner*—Young Lee
(74) *Attorney, Agent, or Firm*—Michael J. Balconi-Lamica (57) ABSTRACT

A method for dynamically determining frames required to build a complete picture in an MPEG video stream includes decoding an order of frames in the MPEG video stream according to a dependency vector model. The dependency vector model is configured for determining a dependency vector as a function of the decode order video stream for seamless operation over several types of MPEG streams. The method also includes performing frame accurate representations of the MPEG stream in a bidirectional fashion as a function of the dependency vector determined according to the dependency vector model.

18 Claims, 4 Drawing Sheets

Expansion of Video Slices

METHOD AND APPARATUS FOR DYNAMIC DETERMINATION OF FRAMES REQUIRED TO BUILD A COMPLETE PICTURE IN AN MPEG VIDEO STREAM

BACKGROUND

The present disclosures relate generally to MPEG video streams and more particularly, to dynamic determination of frames required to build a complete picture in an MPEG video stream.

MPEG is short for Moving Picture Experts Group, a working group of the International Standards Organization, and also refers to a family of digital video compression standards and file formats developed by the group. MPEG generally produces better-quality video than competing formats. In addition, MPEG files can be decoded by special hardware or by software.

In MPEG video streams, video data is reordered to assist in removing temporal similarities and thus increasing compression in the data stream. While this compression helps with, and is designed to allow for, forward play of the stream, difficulties arise when trying to play the stream in reverse order or start the stream at a random location in the stream. In particular, this issue arises in the context of Personal Video Recorder (PVR) applications. A PVR system must be able to stop the stream, advance slowly or quickly, and play the MPEG stream in reverse. For all of these play-back operations, the ability to build the pictures accurately is required, and thus all of the dependencies within the video stream are required.

Most PVR solutions today solve these problems in very brute force, computationally intensive ways. For example, one known solution includes reversing several frames and forcing that stream into the video decoder, hopefully coming up with a reasonable stream.

Accordingly, it would be desirable to provide an improved method for determination of frames required to build a complete picture in an MPEG video stream for overcoming the problems in the art.

BRIEF DESCRIPTION OF THE DRAWINGS

The embodiments of the present disclosure are illustrated by way of example and not limited by the accompanying figures, in which like references indicate similar elements, and in which.

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The embodiments of the present disclosure utilize a dependency vector for determining the dependencies for a given frame in a video stream. While it may be easy to understand how such a dependency vector can be used to make playback simple, determining the vector is more difficult. The embodiments of the present disclosure allow for an individual frame to be determined, and built, from a random MPEG stream.

For a standard MPEG video stream (IPB stream), a dependency vector is determined by looking back into the video stream, from a particular point in the stream, to the last I-frame that occurred. At this point in the stream, because of the I-frame, all of the lines are intracoded and a complete picture can be displayed. The incremental changes between that frame and a current frame (P frames) are also required.

For an open GOP (group of pictures) case, the determination is slightly more difficult. When there is an open GOP, the B-frames that occur immediately after a given I-frame have dependencies ranging all the way back two I-frames. This makes the dependency vector rather long for these B-frames. While it may seem simple to describe, the implementation is slightly more complex in that this case is not identified by anything other than the position of the frames in the stream. Once it is determined, the dependency vector is reasonably easy to create.

The final case is by far the most difficult. This is the I-slice stream case. In an I-slice stream, there is no absolute reference for a complete picture in the stream. Such a complete reference is determined by several P-frames. All of the P-frames must be examined to determine the placement of their individual intracoded lines, and how those individual intracoded lines combine to build a complete frame. It must also be remembered that while most I-slice MPEG streams have the P-frames intracoded in order, such an ordering is not a requirement. Thus, the algorithm for determining dependencies must be able to determine when a complete frame is built from arbitrarily spaced intracoded lines. In view of the fact that a video stream can change between all of the above mentioned formats, the entire dependency vector determination must be done using an integrated formula.

Figure 1:
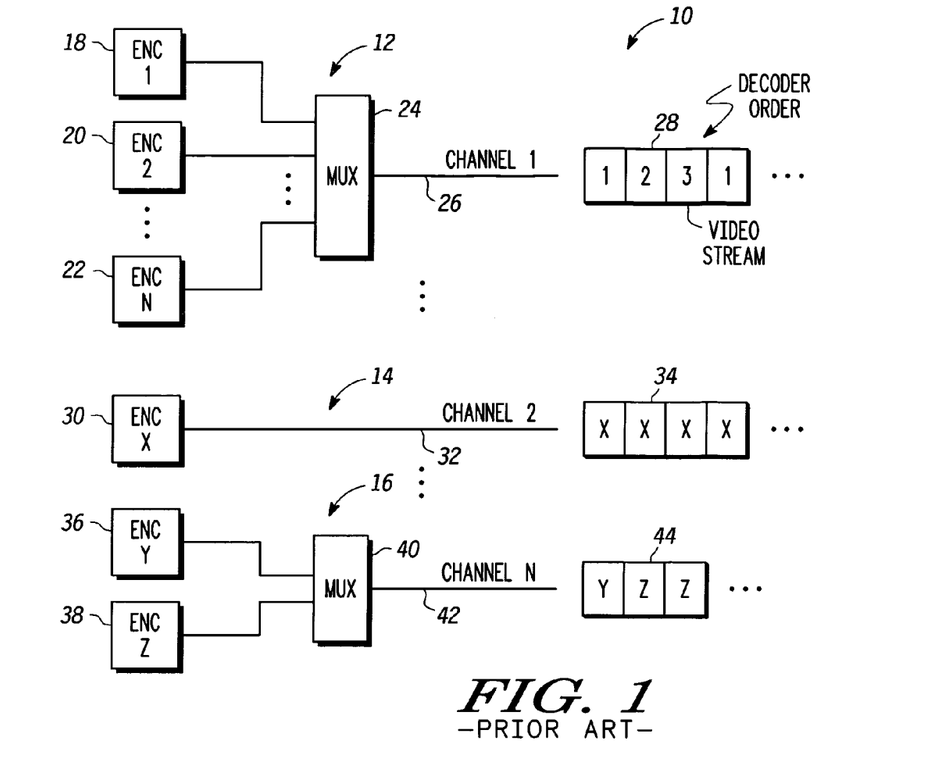
FIG. 1 is a block diagram view representation illustrating various configurations of a channel for producing a video stream known in the art.

FIG. 1 is a block diagram view 10 illustrating various configurations of channels 1, 2, and through N, wherein the configurations are indicated by corresponding reference numerals 12, 14, and 16, respectively. The various configurations of a channel are adapted for producing video streams, as indicated by reference numerals 28, 34, and 44, respectively, further as known in the art. As shown, channel 1, indicated by reference numeral 12, includes a plurality of input encoders (ENC1, ENC2 to ENCN) as indicated by reference numerals 18, 20 and 22, respectively. The input encoders couple to multiplexer 24 for being multiplexed onto output 26 and into a decode order video stream 28. In other words, encoders 18, 20 and 22 are used to provide a single video program output as video stream 28. Accordingly, each encoder can provide video that occupies a different amount of the video stream 28. For example, encoder 18 may be used for providing a main program and encoder 20 may be used to provide a commercial break. Furthermore, encoder 18 has a first group of settings for providing a corresponding encoded signal, whereas encoder 20 could have a second group of settings different from the first group of settings of encoder 18 for providing a differently encoded signal.

With respect to channel 2, indicated by reference numeral 14, an input encoder (ENCX) 30 has an output 32 and provides a decode order video stream 34 on output 32. With respect to channel N, indicated by reference numeral 16, the channel includes two input encoders (ENCY, ENCZ) as indicated by reference numerals 36 and 38, respectively. The input encoders couple to multiplexer 40 for being multiplexed onto output 42 and into a decode order video stream 44. In other words, encoders 36 and 38 are used to provide a single video program output as video stream 44. Accordingly, in connection with channel 16, each encoder (36,38) can provide video that occupies a different amount of the video stream 44. Encoder 36 has a first group of settings for providing a corresponding encoded signal, whereas encoder 38 could have a second group of settings different from the first group of settings of encoder 36 for providing a differently encoded signal.

It is possible that one or more of encoders 18, 20, 22, 30, 36 and 38 could have different configurations, that is, a first configuration that is different from a second configuration, and so on. It is also possible that an information handling system could receive any one of the video streams of channels 1, 2, or N (indicated by reference numerals 12, 14, and 16, respectively) depending upon channel selection. Still further, one or more of the encoders 18, 20, 22, 30, 36 and 38 could be configured to change its encoder settings on a real-time basis, depending upon a video signal input, for example.

Figure 2:
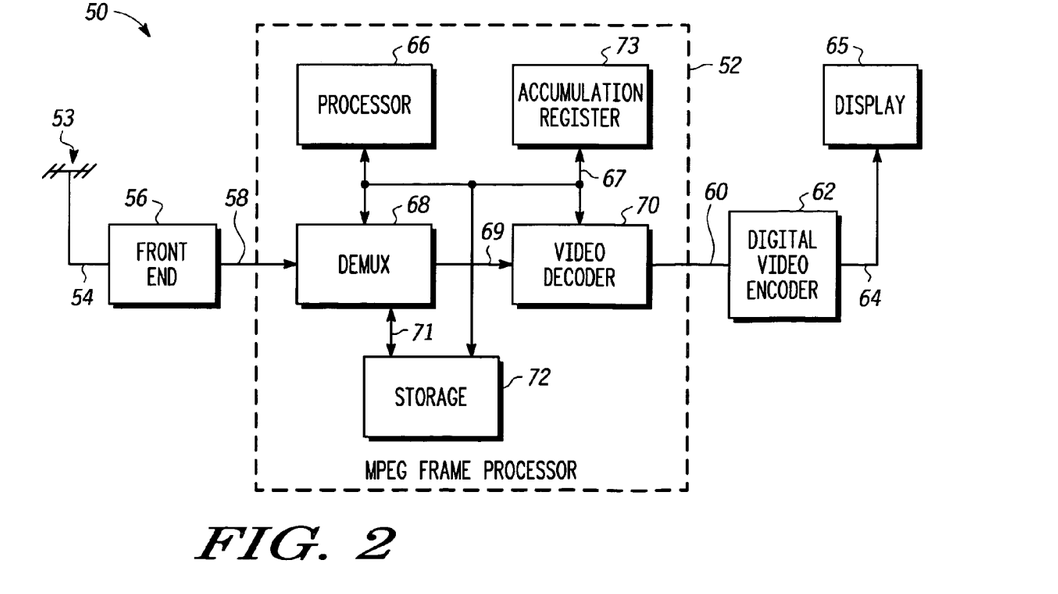
FIG. 2 is a block diagram view representation of an information handling system incorporating a frame processor according to one embodiment of the present disclosure.

FIG. 2 is a block diagram view representation of an information handling system 50 incorporating a frame processor 52 according to one embodiment of the present disclosure. Information handling system 50 receives a decode order video stream via input 58. Input 58 can be derived from a radio frequency (RF) signal received on input 54 from antenna 53 and processed by front end 56. Front end 56 can include a tuner, demodulator, amplifier(s), etc. as is known in the art. Alternatively, input 58 could also be provided directly from other sources, such as the Internet, a computer network, etc.

Frame processor 52 provides uncompressed video frames in display order on output 60. Output 60 is input into digital video encoder 62. Digital video encoder 62 is responsive to output 60 and provides a video signal on output 64. The video signal is suitable for display on a display device 65. Display device 65 includes any suitable display, such as, a CRT, LCD, plasma, or the like.

Frame processor 52 comprises a host processor 66, demultiplexor 68, video decoder 70, and storage 72. In one embodiment, host processor 66 includes executable computer code for performing dependency vector determinations according to the embodiments of the present disclosure, further to be discussed herein. Alternatively, performing dependency vector determinations can also occur in other processor type implementations, a hardware implementation, or a combination of hardware and software implementations.

In one embodiment, host processor 66 couples to demultiplexor 68, video decoder 70, and storage 72 via a suitable bus 67. Demultiplexor 68 couples to video decoder 70 via signal line 69. Furthermore, demultiplexor 68 couples to storage 72 via signal line 71. Signal lines 69 and 71 could also include signal buses. Other embodiments are possible. For example, the coupling between one or more of the host processor, demultiplexor, video decoder, and storage can be configured differently than discussed above.

According to one embodiment, in operation, a video stream is included within a signal on input 58 into demultiplexor 68. In response to a detection of the video stream within the signal on input 58, demultiplexor 68 creates an index. The index provides one way to look for the dependencies in the video stream. While the index is not critical to the finding of dependencies, it provides one way to implement the method and apparatus according to the embodiments of the present disclosure. The index and the video stream are stored in storage 72. Storage allocation and signal routing of the index and the video stream is managed by host processor 66. Upon request of host processor 66, a video stream can be copied from storage, passed to demultiplexor 68, and then forwarded onto video decoder 70. Video decoder 70 decompresses the video stream and reorders the decompressed video stream in display order as further discussed herein. Subsequent to reordering the decompressed video stream in display order, the video decoder 70 provides the video stream in display order on output 60. Output 60 is input into digital video encoder 62.

For typical video processing, no storage is required. In other words, when standard video processing is occurring a decode order MPEG stream is being provided by front end 56 through input or interface 58. Demultiplexor 68 finds the video stream which is requested by host processor 66 and delivers that to video decoder 70 via interface 69. Video decoder 70 interprets the MPEG decode order compressed video stream and outputs it in display order to digital video encoder 62 via interface 60.

For reverse order video processing, minimal storage and an accumulation register are needed. In other words, when decoding a compressed video stream in reverse order the video stream comes from storage 72. Whether the compressed video stream was recently placed on the storage or was placed there by recording a program is insubstantial to decoding. Host processor 66 acquires the index from storage 72. This index is used to determine which video frames need to be given to digital video encoder 62 by video decoder 70. Host processor 66 uses the index and accumulation register 73 to determine which segments of the compressed video stream are required to output the appropriate video frames using methods discussed herein. These segments of the compressed video stream are taken from storage 72, through demultiplexor 68 and passed on to video decoder 70. The specifics of how each block (72, 68 and 70) processes the compressed video stream is determined by host processor 66 and communicated to them via interface 67. The processes of determining the output frames, and the segments of the compressed video stream used to build them, continues as long as reverse play of the video stream is requested.

Figure 3:
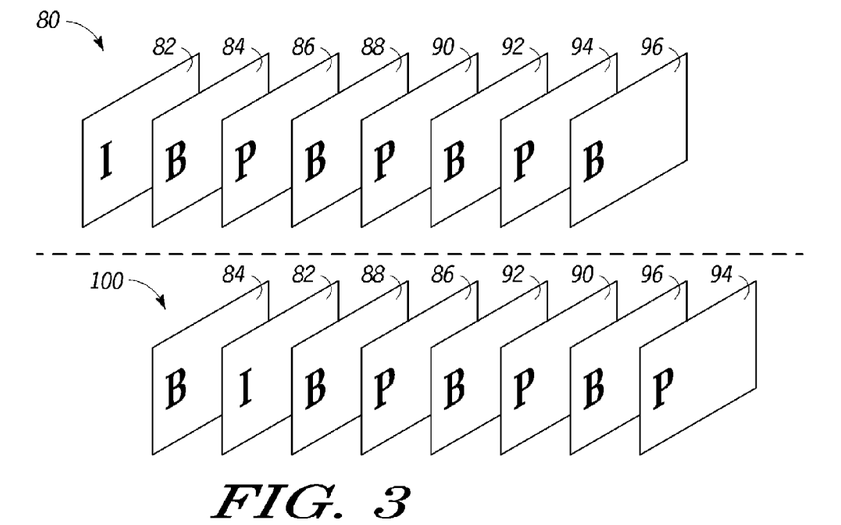
FIG. 3 is a representative view of successive video frames of a compressed video stream in decode order and an associated video stream in display order.

FIG. 3 is a representative view of successive video frames of a compressed video stream 80 in decode order. FIG. 3 also illustrates video stream 80 in display order as represented by video stream 100. Compressed video stream 80 includes a series of frames, eight of which are shown for simplicity of illustration. The eight frames are indicated by reference numerals 82-96. In addition, frames occurring prior to and subsequent to the eight illustrated frames are indicated by ellipses " . . . ". In particular, in the video stream 80, frame 82 comprises an I-frame, frame 84 comprises a B-frame, frame 86 comprises a P-frame, frame 88 comprises a B-frame, frame 90 comprises a P-frame, frame 92 comprises a B-frame, frame 94 comprises a P-frame, and frame 96 comprises a B-frame.

In the MPEG standard, each frame can be coded in one of three modes: intraframe (I), forward prediction (P), and bidirectional prediction (B). An I-frame is defined as an entirely independent frame, having no dependencies. In I frames, every macroblock of the frame must be coded in intraframe mode, i.e., no prediction is used. Accordingly, I frames are coded independently of other frames. P-frames depend on a prediction based on the preceding anchor frame (I or P frame). In P frames, each macroblock of the frame can be coded with forward prediction or in intraframe mode. B-frames depend on a prediction based on the preceding and following I or P frames. Notice that each B-frame depends on data from a future frame, i.e. future frame must be (de)coded before the current B-frame can be (de)coded. For this reason, the coding order is distinguished from the display order. In B frames, each macroblock of the frame can be coded with forward, backward, or bidirectional prediction. One motion vector (MV) is specified for each forward- and backward-predicted macroblock while two MVs are specified for each bidirectionally predicted macroblock. Thus, each P-frame has a forward motion vector field and one anchor frame, while each B-frame has a forward and backward motion vector field and two anchor frames.

Accordingly, MPEG requires the coded video data be placed in the data stream in coding order. Furthermore, an anchor frame can include an I-frame or a P-frame. A logical structure which represents the smallest internally referenced set of video frames in some MPEG streams is referred to as a Group of Pictures (GOP). The GOP does not specify the number of I, P, or B frames in the GOP, nor does it specify the order of the frames in the GOP. The structure of the GOP is completely determined by the order of the data in the stream. While there are no rules that restrict the size and structure of the GOP, buffer constraints should be satisfied.

Referring still to FIGS. 2 and 3, the video decoder 70 re-orders the decode order frames of stream 80 into a display order stream 100 as a function of respective frame dependencies. In particular, display order video stream 100 includes a series of frames, eight of which are shown for simplicity of illustration. Frames occurring prior to and subsequent to the eight illustrated frames are indicated by ellipses " . . . ". The eight frames in display order of stream 100 comprise 84, 82, 88, 86, 92, 90, 96, and 94. The reordering is accomplished as a function of decoding the compressed video stream, further as determined by a nature of the encoding. For example, frame 88 is a B-frame depending from I-frame 82 and P-frame 86.

Figure 4:
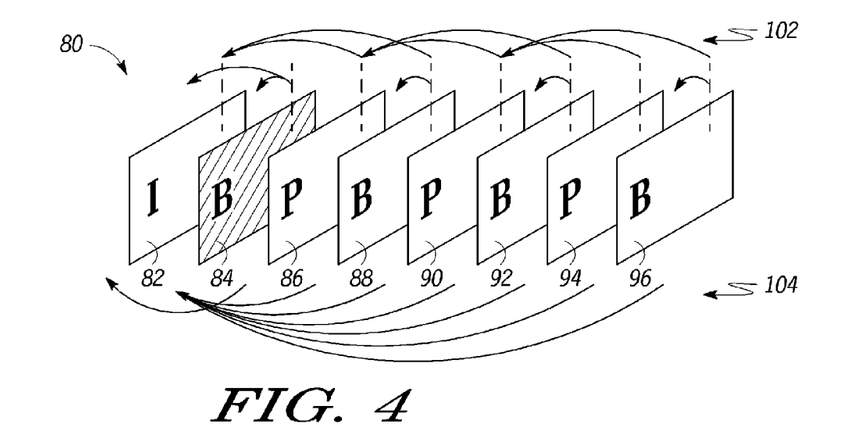
FIG. 4 is a representative view of successive video frames of a compressed video stream in decode order illustrating relative dependencies and absolute dependencies of the individual frames.

FIG. 4 is a representative view of successive video frames of a compressed video stream 80 in decode order illustrating relative dependencies and absolute dependencies of the individual frames. As noted herein above, compressed video stream 80 includes a series of frames, eight of which are shown for simplicity of illustration. The eight frames are indicated by reference numerals 82-96. In addition, frames occurring prior to and subsequent to the eight illustrated frames are indicated by ellipses " . . . ".

Relative dependencies are illustrated by dependency vectors 102. For example, P-frame 86 relatively dependents on I-frame 82. B-frame 92 relatively dependents on P-frame 90 and P-frame 86. P-frame 94 relatively dependents on P-frame 90, and so on. On the other hand, absolute dependencies are illustrated by dependency vectors 104. For example, P-frame 86 absolutely dependents on I-frame 82. B-frame 92 absolutely dependents on I-frame 82 via the P-frames 90 and 86. P-frame 94 relatively dependents on P-frame 90, which relatively depends on P-frame 86, which relatively depends on I-frame 82, therefore the absolute dependency is to I-frame 82. Frames 88, 90, and 96 are similarly dependent absolutely on I-frame 82. Note, however, that B-frame 84 has a relative dependency, as well as an absolute dependency, outside of the illustrated frames. By the placement of B-frame 84 immediately following I-frame 82, the GOP shown is considered an open GOP, meaning that dependencies are required outside of the GOP.

The absolute dependency is determined for each frame by following the chain of dependencies until the entire frame can be displayed. In compressed video stream 80, this is accomplished with I-frame 82, an entirely intracoded frame. For example, P-frame 90 is dependent on P-Frame 86, which in turn is dependent on I-frame 82. This makes the absolute dependency for P-frame 90 I-frame 82.

Figure 5:
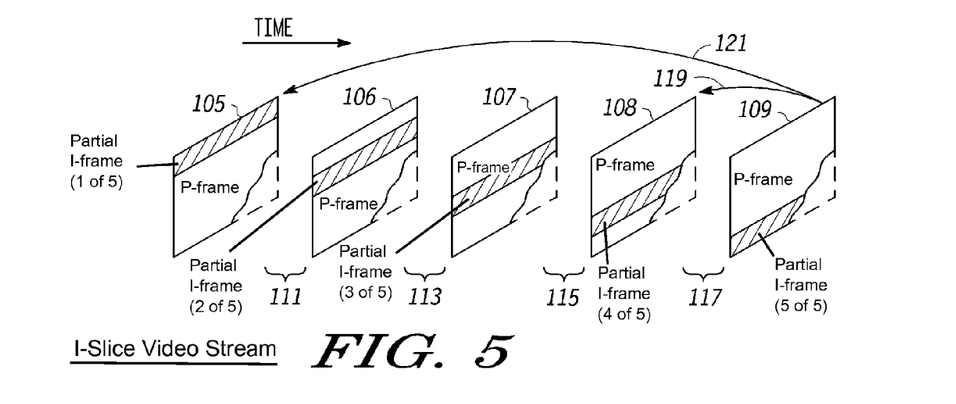
FIG. 5 is a representative view of successive video frames of an I-slice video stream implementation in decode order, illustrating one example of different requirements for creating dependency vectors caused by different configuration settings of video stream encoders.

FIG. 5 is a representative view of successive P-frames of an I-slice video stream implementation in decode order as a function of time, from left to right in the figure. FIG. 5 illustrates one example of different requirements for creating dependency vectors caused by different configuration settings of video stream encoders. An I-slice video stream generally refers to a video stream containing P-frames of partial I-frames, wherein a given number of P-frames containing the partial I-frames are needed to produce a complete I-frame. Typically, I-slice streams do not contain any I-frames. As shown in FIG. 5, frames 105, 106, 107, 108 and 109 represent P-frames that contain partial I-frames. In this example, the partial I-frames comprise one-fifth of an I-frame. Further in connection with FIG. 5, in the sections of the video stream as indicated by reference numerals 111, 113, 115, and 117, occurring in-between the illustrated P-frames, there may occur (i) zero, or (ii) one or more of (a) B-frames or (b) P-frames without intracoding (i.e., without any partial I-frame). As illustrated by dependency vector 119, P-frame 109 relatively depends on P-frame 108, and furthermore, absolutely depends on P-frame 105, as indicated by dependency vector 121.

For reverse play, consider the following. Given an MPEG data stream, a goal of reverse-play is to display the frames in reverse order on the output of the frame processor. For uncoded video, the solution is simple: send the video frames in reverse order. The simplicity of such a solution relies on two properties: the data for each video frame is self-contained and it is independent of its placement in the data stream. However, such properties typically do not hold true for MPEG-coded video data.

Reverse play decoding is difficult because MPEG compression is not invarient to changes in frame order, e.g. reversing the order of the output MPEG bitstream. Furthermore, reversing the order of the input video frames does not result in a "reversed" motion vector field. Also, practical limitations exist in that the entire stream can not be easily decompressed, and then simply displayed in reverse order.

Figure 6:
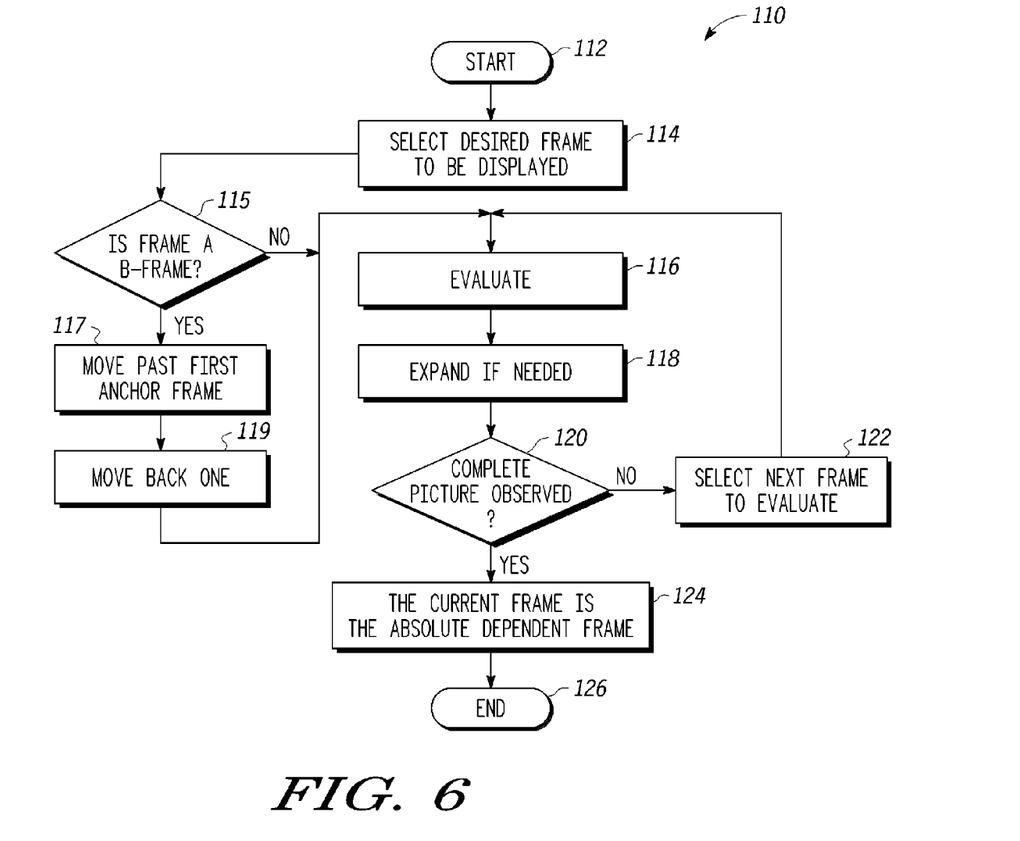
FIG. 6 is a flow diagram view of a dependency vector determination algorithm according to one embodiment of the present disclosure.

FIG. 6 is a flow diagram view of a dependency vector determination process 110 used in accordance to one embodiment of the present disclosure. The dependency vector determination process 110 begins at step 112 and proceeds to step 114. In step 114, the process chooses a desired frame to be displayed. The process then continues by determining if the current frame is a B-frame in step 115. If the frame is not a B-frame, then the process continues on to step 116 to evaluate the frame. On the other hand, if the desired frame is a B-frame, then the first anchor frame that is a relative dependency of the B-frame is found in step 117. The first anchor frame corresponds to the anchor frame that most immediately precedes the B-frame in decode order, although the anchor frame may be separated by a) zero, b) one, or c) many B-frames from the desired B-frame. Subsequent to finding the first anchor frame, the process continues to step 119. In step 119, a next frame in decode order is found and thereafter presented to step 116.

Step 116 performs an evaluation of the chosen frame that includes determining where the accumulation buffer is to be marked based upon where in the chosen frame the zero, or one or more intracoded sections occur. Note that the accumulation buffer can include, for example, accumulation register or RAM 73 or any other suitable memory within frame processor 52, such as storage 72. In the case of an I-frame being chosen and/or received, the accumulation buffer is entirely marked, since all sections of the I-frame are intracoded. In other examples, a P-frame with a partial I-frame could include some fraction of an I-frame. Recall that an I-frame is a totally intracoded frame. In such an instance, the accumulation buffer is marked as a function of the intracoded section portions of the P-frame comprising the partial I-frame. In the case of a P-frame with a one-fourth I-frame content, one-fourth of the accumulation buffer is marked in a corresponding location representative of the I-frame content of the P-frame. Similarly, in the case of a P-frame with a one-fifth I-frame content, one-fifth of the accumulation buffer is marked in a corresponding location representative of the I-frame content of the P-frame. With respect an occurrence of B-frames within the video stream, the evaluation results in no marking of the accumulation buffer since the B-frames contain no intracoded sections.

It is noted that sometimes the number of slices within the frames of a video stream are not necessarily consistent. Accordingly, an adjustment is needed to compensate for the differing number of slices in different frames. If necessary, such an adjustment is performed in Step 118; otherwise, the process proceeds to Step 120. In Step 118, the actual number of slices in the chosen frame can be expanded to a different number of slices, if needed. The number of slices could be a static number of slices, or could be determined dynamically based upon the input video stream. A further discussion of expanding the number of slices to a uniform number of slices is provided in connection with FIG. 7, as discussed further herein below.

Referring still to FIG. 6, in Step 120, a query determines whether the status of the accumulation buffer indicates that sufficient intracoded slices have been accumulated, thus allowing for a complete frame or picture to be output. Sufficiency can be determined according to the requirements of a particular frame processor implementation. That is, sufficiency equates to a given percentage of the total slices in a video frame. In one example, sufficiency corresponds to a percentage of the total slices on the order of ninety percent (90%). Again, as mentioned, sufficiency is determined according to the requirements of a particular frame processor implementation.

Responsive to determining that sufficient intracoded slices have not been accumulated, the process proceeds to step 122. In Step 122, the process chooses a next frame in the video stream to evaluate. In one embodiment, for displaying a decode order video stream in forward or reverse order, the next chosen frame corresponds to a previous frame in the decode order. The process then continues to Step 116 with the next chosen frame, and thereafter proceeds as discussed herein above.

Responsive to determining that a sufficient number of intracoded slices have been accumulated for a complete frame or picture to be observed in step 120, the process proceeds to step 124. In Step 124, the current chosen frame is determined to be the absolute dependency of the frame selected in Step 114 and the process ends at Step 126.

Figure 7:
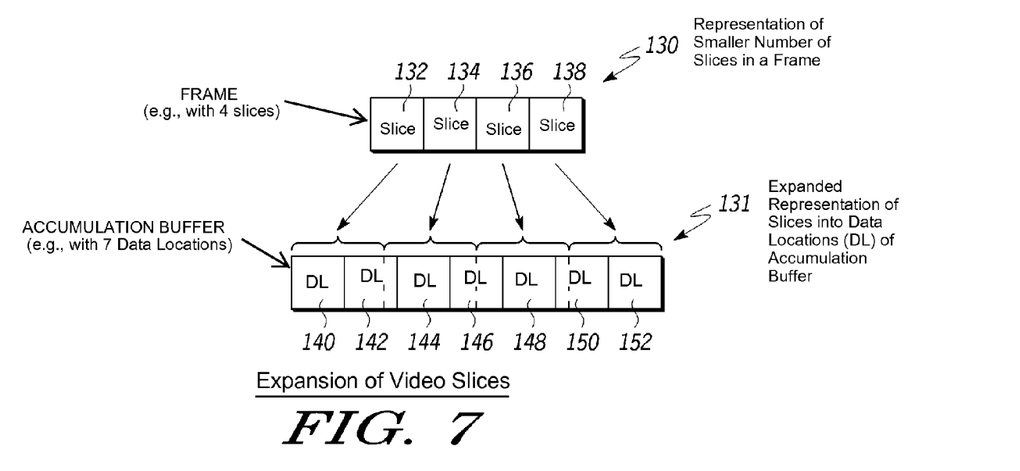
FIG. 7 is a diagram view illustrating an expansion of video slices according to another embodiment of the present disclosure.

FIG. 7 is a diagram view illustrating an expansion of video slices in connection with an embodiment of the present disclosure. As indicated above, it is noted that sometimes the frames of a video stream can contain different numbers of slices among various frames of the video stream. That is, the number of slices is not guaranteed to be uniform between pictures of the video stream. Accordingly, an adjustment may be needed to compensate for the differing number of slices in different frames.

If the number of slices in a frame presently under evaluation and the accumulation buffer differ in the number of slices, then the smaller of the two is expanded to the size of the larger, resulting in a uniform number of slices for evaluation purposes. As shown in FIG. 7, the smaller number of slices is represented by reference numeral 130. Reference numerals 132, 134, 136, and 138 represent slices or data locations of the accumulation buffer. As illustrated, the representation 130 is expanded to representation 131.

More particularly, the four slices or data locations (132, 134, 136, and 138) of representation 130 are expanded into seven slices or data locations (140, 142, 144, 146, 148, 150, and 152) of representation 131. The slice 132 is expanded into slice 140 and a portion of slice 142. The slice 134 is expanded into a remaining portion of slice 142, slice 144 and a portion of slice 146. The slice 136 is expanded into a remaining portion of slice 146, slice 148 and a portion of slice 150. Lastly, slice 138 is expanded into a remaining portion of slice 150 and slice 152. The expansion comprises a form of upsampling. As indicated herein above, the uniform number of slices could be a static number of slices, or could be determined dynamically based upon the video stream.

The embodiments of the present disclosure advantageously provide a continuous method for determining how the frames of an MPEG video stream relate to each other, in particular, in reverse order. In addition, the embodiments of the present disclosure require only one local copy of the MPEG video stream for the dynamic determination of frames required to build a complete picture in the video stream. Accordingly, the embodiments require only a minimal amount of storage for purposes of determining how the frames relate to each other in reverse order. The embodiments of the present disclosure also provide for small jumps in the forward and/or reverse play-back of the video stream.

Figure 8:
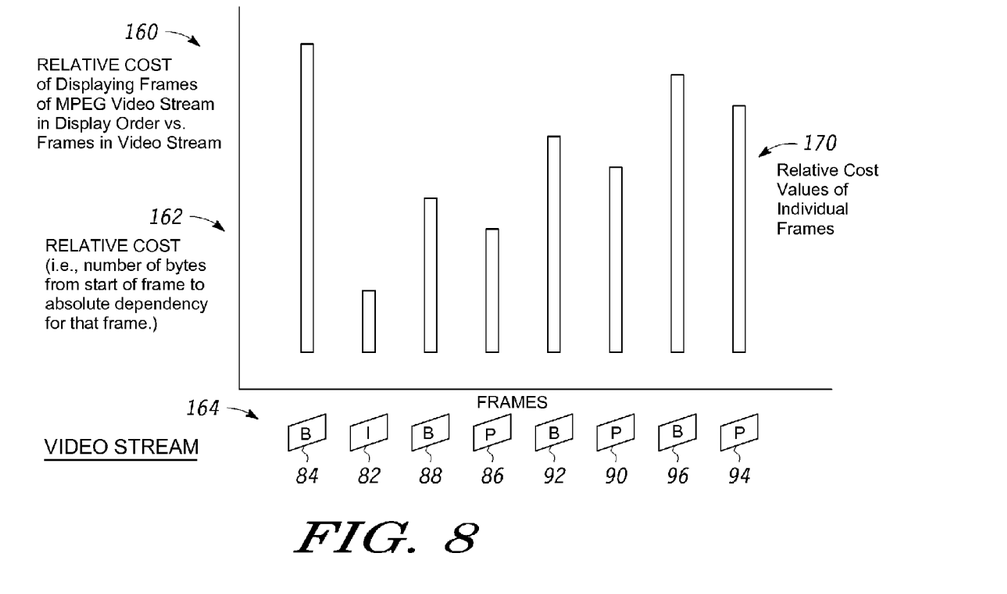
FIG. 8 illustrates a graph of relative cost of displaying frames in an MPEG video stream in display order.

FIG. 8 illustrates a graph 160 of a relative cost of displaying frames in an MPEG video stream in display order. In one embodiment, the relative cost is determined or calculated using the number of bytes from the start of the frame to the absolute dependency for that frame. The Y-axis 162 represents the relative cost and the bars 170 represent the relative costs of each frame of display order stream 164. More particularly, it can be noted that the cost of displaying a particular frame from stream 164 increases the further away from I-frame 82 that the particular frame is. Also, it can be noted that the cost of anchor frames is less than the B-frames that precede them as illustrated, for example, by the difference between the cost of B-frame 88 and P-frame 86. The reason for this is because of the dual dependencies of B-frame 88, one of which is P-frame 86. Therefore, in order to display B-frame 88, all of the requirements for P-frame 86 are necessary in addition to the data for B-frame 88 itself.

Figure 9:
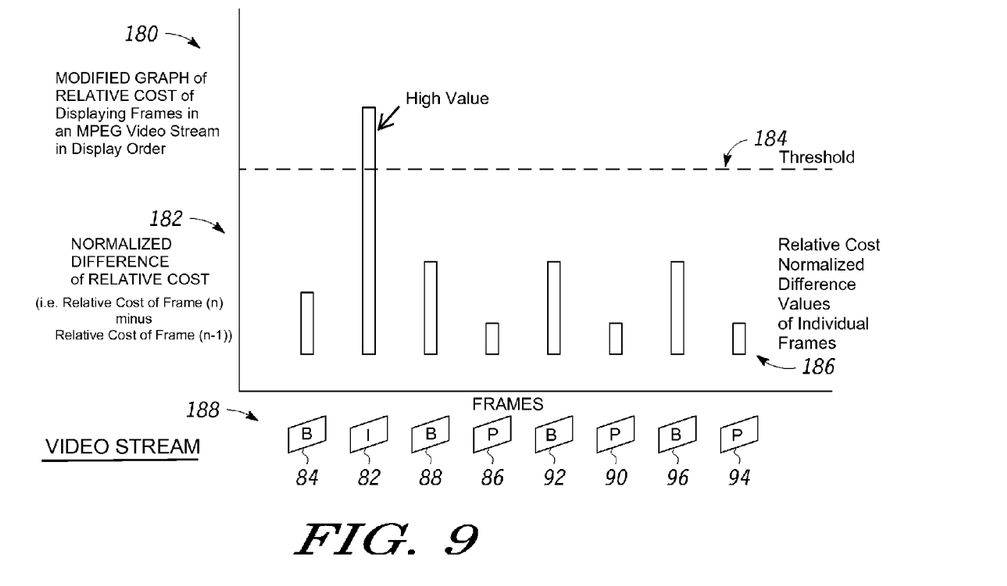
FIG. 9 illustrates a modified graph of relative cost of displaying frames in an MPEG video stream in display order as derived from the graph of FIG. 8.

FIG. 9 illustrates a modified graph of relative cost of displaying frames in an MPEG video stream in display order, as derived from the graph of FIG. 8. Graph 180 is the result of taking graph 160 and applying a simple difference to each of the frames (i.e., a difference filter). In other words, a particular frame value is replaced with the difference between the height of its entry in graph 160 and the height of the entry previous to it in graph 160. All differences are normalized. For example, the value of frame 82 in graph 160 has the value of frame 84 subtracted from it and is then normalized to produce a new value. The new value is used for the value of frame 82 in graph 180 of FIG. 9, wherein new values for individual frames are collectively represented by reference numeral 186.

Referring still to FIG. 9, graph 180 also includes a threshold 184. Threshold 184 is determined such that one value occurs over a given range. The threshold 184 is determined dynamically as a function of the input stream, for example, input video stream 188. With knowledge of the threshold 184, optimal splices in the video stream can be determined. Locations of high values present in graph 180 identify optimized locations to place splice points within the stream. By calculating the cost of the frames in the display stream, applying the difference filter, and determining the threshold, the selection or determination of splice points for reverse play can be optimized for the stream.

Splice points are required when playing compressed video streams in reverse due to limitations in the implementation of the video frame decoder. Such limitations will depend on the particulars of the video frame processor being used, and thus will change the threshold determination. However, in all cases, splices must be determined. Even if the required memory space needed for playing compressed video streams in reverse order is greater than an available memory space, a splice (and thus a corresponding splice point) would want to be configured so as to insure that an optimal use of that memory space is occurring.

According to another embodiment, splice segments that are input to the video decoder each begin with a splice header. The splice header indicates the number of frames in a corresponding segment. However, a problem can arise from a splice segment spanning multiple GOPs. If the splice segment spans more than one GOP, then the list of dependencies grows dramatically. Accordingly, the method of the present disclosure requires that a splice segment not cross a boundary from one GOP to another GOP, to maintain the list of dependencies within a given size parameter selected according to the requirements of the particular MPEG decoder system implementation.

In addition, determining a cost of frames can include the following. For example, the addition of extra frames into a splice segment can have several adverse effects on the system. First, increasing the number of frames causes the video decoder to have to decode more frames. In such an embodiment, this applies only to anchor frames, since the video decoder does not decode B-frames that the system is not displaying, however, such an optimization is not required for implementing the embodiments according to the present disclosure. Second, extra frames can also mean that extra data may have to be retrieved from the system hard drive, and then routed through memory. Accordingly, in one embodiment, the cost of a frame is associated with a transport packet count, wherein the transport packet count corresponds to a number of transport packets a given picture needs to be properly displayed. The transport packet count is used since the hard drive bandwidth is a gating factor for many PVR operations and since it is easy to calculate using the method of marking in the index of this embodiment.

Furthermore, calculating the GOP size can include the following. For example, when a group of frames is dependent on a single I-frame, the cost for individual frames of the GOP declines with proximity to the I-frame of the corresponding individual frames. However, when a next GOP occurs, the cost of the frames increases dramatically. Using this property of cost, the size of the GOP can be found. In one embodiment, an array of costs of individual frames is created. While the size of the array is not critical, it must be larger than the GOP that is being detected. However, the GOP size could be detected in cases where the array is smaller, but a detection of the GOP size can not be guaranteed unless the array size is larger than the GOP. Furthermore, while GOP size detection is not critical for 1× speeds (i.e., the splice header will run out before the end of the GOP is achieved), at higher speeds the detection of the full GOP is more important. Accordingly, the resulting cost array will appear similar to that as shown in FIG. 8, wherein a cost value increases slowly through the array. In addition, near the beginning of the cost graph in FIG. 8, it can be seen that there exists a point in which cost drops off dramatically. The large drop in cost is indicative of an edge of a GOP.

Still further, to assist with the edge detection, the host processor is configured to find a significant change in cost by utilizing an edge detection filter. At the end of processing, the cost array consists of an array of costs occurring below a threshold amount and having at least one cost occurring above the threshold amount. The cost that occurs above the threshold amount corresponds to an edge of the GOP.

The embodiments of the present disclosure could be used in any PVR system where frame accurate reverse and various speeds are required. It is likely that all MPEG video decoders will be required to be used in PVR type applications, whether these occur in a traditional set-top box environment, in a smaller cached environment like a cellular phone, or other end-use application.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments. For example, the present embodiments can apply to set-top boxes, cellular phones, PDAs, portable video players, car based video systems, etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for dynamically determining frames required to build a complete picture in an MPEG video stream comprising:

decoding an order of frames in the MPEG video stream according to a dependency vector model, the dependency vector model being configured for determining a dependency vector as a function of the decode order video stream for seamless operation over several types of MPEG streams, wherein the dependency vector model determines the dependency vector by reviewing frames of a decode order video stream in a reverse direction until a complete intracoded picture can be derived and in which a given frame of the dependency vector is identified as an absolute dependency of a frame to be displayed, the dependency vector model further comprising (i) determining a relative cost of displaying frames in the MPEG video stream in display order, wherein the relative cost is determined as a function of a number of bytes from the start of a frame to the absolute dependency for that frame, (ii) using a difference filter for modifying the relative cost of displaying frames in the MPEG video stream in display order, and (iii) selecting a splice point as a function of a frame having a modified relative cost exceeding a threshold amount; and performing frame accurate representations of the MPEG stream in a bidirectional fashion as a function of the dependency vector determined according to the dependency vector model.

2. The method of claim 1, wherein reviewing comprises:

loading a current frame of the decode order video stream into a buffer;

querying whether all lines of the current frame are intracoded; and if all lines of the current frame are intracoded, then designating the current frame as an absolute dependent frame, otherwise, if all lines of the current frame are not intracoded, then loading a previous frame into the buffer, wherein the previous frame becomes the current frame and thereafter repeating the querying.

3. The method of claim 2, wherein the decode order video stream includes a first picture that comprises a first number of intracoded slices and a second picture that comprises a second number of intracoded slices, wherein the first number is different from the second number.

4. The method of claim 3, further comprising:

accommodating for a change in the number of slices between the first and second picture by upsampling (i) a smaller number of slices of the first picture to a larger number of slices of the second picture or (ii) a smaller number of slices of the second picture to a larger number of slices of the first picture.

5. The method of claim 2, wherein a number of slices between pictures of a decode order video stream is non-uniform.

6. The method of claim 5, further comprising:

accommodating changes in the number of slices between pictures in the decode order video stream.

7. The method of claim 1, wherein the types of MPEG streams comprise (i) a standard MPEG video stream, (ii) an open group of pictures (GOP) and (iii) an I-slice stream.

8. The method of claim 7, wherein for the standard MPEG video stream, a closed group of pictures (GOP) includes the occurrence of two anchor frames prior to an occurrence of a B-frame within the decode order video stream, wherein the two anchor frames include I frames, P frames, or I and P frames.

9. The method of claim 7, wherein for the open group of pictures (GOP), the open GOP includes the occurrence of a B-frame immediately following the occurrence of an I-frame within the decode order video stream, wherein the B-frame depends from an anchor frame that occurs within a previous GOP, thereby creating a dependency into a previous GOP of the decode order video stream.

10. The method of claim 7, wherein for the I-slice stream, the I-slice stream contains a number of P-frames needed to produce a one-hundred percent intracoded picture, each P-frame containing a given percentage of intracoded data.

11. The method of claim 10, wherein the number of P-frames comprises five (5) P-frames.

12. The method of claim 1, wherein determining the dependency vector comprises determining MPEG frame dependencies that include relative dependencies and absolute dependencies, wherein relative dependencies include anchor frames that are dependent on a previous occurring anchor frame within the decode order video stream, further wherein absolute dependencies include dependencies that bottom out at an I-frame for a group of pictures (GOP) within a decode order video stream.

13. The method of claim 12, wherein the GOPs include GOPs of various lengths which correspond to various numbers of frames, including a GOP absent of an I-frame which corresponds to a I-slice video stream GOP.

14. The method of claim 1, wherein the splice point indicates an edge of a GOP.

15. The method of claim 1, wherein the dependency vector determination is one of (i) a hardware implementation, (ii) a software implementation, or (iii) a combination of hardware and software implementations.

16. The method of claim 1, further comprising:

determining relative dependencies of frames within a group of pictures (GOP), wherein the GOP comprises a number of frames in display order.

17. The method of claim 16, still further comprising:

determining absolute dependencies of the frames within the GOP.

18. An information handling system comprising:

input for receiving a video stream, wherein the video stream comprises a decode order video stream that is a function of a channel selection;

a frame processor responsive to the decode order video stream for providing a signal of uncompressed video frames in display order on an output; and digital video encoder, responsive to the uncompressed video frames in display order, for providing an video signal suitable for display on a display device, wherein the frame processor is adapted for performing the method according to claim 1.

* * * * *